US012633993B2

(12) United States Patent
Laghate et al.

(10) Patent No.:  US 12,633,993 B2
(45) Date of Patent:       May 19, 2026

(54) BEAM MANAGEMENT WITH PROBABILISTIC BEAM RELATIONS

(71) Applicant: QUALCOMM Incorporated, San Diego, CA (US)

(72) Inventors: Mihir Vijay Laghate, San Diego, CA (US); Raghu Narayan Challa, San Diego, CA (US); Jun Zhu, San Diego, CA (US); Suyash Nachiket Sule, San Diego, CA (US); Nagaraju Gajula, San Diego, CA (US); Uzma Khan Qazi, San Diego, CA (US); Jing Lin, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 18/674,097

(22) Filed: May 24, 2024

(65) Prior Publication Data

US 2025/0365055 A1      Nov. 27, 2025

(51) Int. Cl.
H04B 7/06            (2006.01)

(52) U.S. Cl.
CPC ............................... H04B 7/06952 (2023.05)

(58) Field of Classification Search
CPC .. H04B 17/373; H04B 7/06952; H04B 7/088; H04B 7/0695; H04B 7/06956;
(Continued)

(56) References Cited

U.S. PATENT DOCUMENTS

2021/0336687 A1*  10/2021  Pezeshki ............... H04W 16/28
2022/0190883 A1*   6/2022  Kaya .................. H04B 7/06952
(Continued)

FOREIGN PATENT DOCUMENTS

WO      WO-2024150414 A1 *   7/2024  .......... H04W 72/321
WO      WO-2024230968 A1 *  11/2024  ........... H04B 7/0695
(Continued)

OTHER PUBLICATIONS

R1-2207331 "Other aspects on AI/ML for beam management" by Apple Inc, Aug. 2022, pp. 1-11, 3GPP TSG-RAN WG1 Meeting #110. (Year: 2022).*
(Continued)

*Primary Examiner* — Sophia Vlahos
(74) *Attorney, Agent, or Firm* — Harrity & Harrity LLP

(57)                ABSTRACT
Various aspects of the present disclosure generally relate to wireless communication. For example, a user equipment (UE) may determine a probability of each beam in an initial set of candidate beams being a target beam (for example, a best beam given current channel conditions) according to a current source beam and one or more parameters that relate to a propagation path from a transmitter to the UE. Accordingly, the UE may select, among the beams in the initial set of candidate beams, a set of candidate beams to measure in a beam management procedure according to the respective probabilities of each candidate beam being the target beam, which may reduce power consumption at the UE, reduce a beam selection or beam switching latency, and/or improve performance associated with beamformed communications.

20 Claims, 9 Drawing Sheets

(58) Field of Classification Search
    CPC .............. H04B 7/06964; H04B 7/0691; H04B
                    7/06958; H04L 41/16; G06N 20/00;
                    G06N 3/08; G06N 3/02
    See application file for complete search history.

(56)                     References Cited

U.S. PATENT DOCUMENTS

| | | | |
|---|---|---|---|
| 2024/0022311 A1* | 1/2024 | Bai | H04W 72/542 |
| 2024/0056205 A1* | 2/2024 | Bonfante | H04B 17/328 |
| 2024/0056844 A1* | 2/2024 | Zhu | H04W 16/28 |
| 2024/0063885 A1* | 2/2024 | Ozkoc | H04B 7/088 |
| 2024/0064724 A1* | 2/2024 | Zhu | H04B 7/04026 |
| 2024/0162943 A1* | 5/2024 | Ahmadian Tehrani | |
| | | | H04B 7/06952 |
| 2024/0276265 A1* | 8/2024 | Karabulut | H04W 36/085 |
| 2025/0119198 A1* | 4/2025 | Ma | G06N 20/00 |

FOREIGN PATENT DOCUMENTS

| | | | |
|---|---|---|---|
| WO | WO-2024242698 A2 * | 11/2024 | H04B 17/328 |
| WO | WO-2025013216 A1 * | 1/2025 | H04W 24/02 |
| WO | WO-2025110330 A1 * | 5/2025 | G06N 20/00 |
| WO | WO-2025155223 A1 * | 7/2025 | H04W 24/10 |
| WO | WO-2025176421 A1 * | 8/2025 | H04B 7/088 |
| WO | WO-2025212008 A1 * | 10/2025 | H04B 7/06952 |

OTHER PUBLICATIONS

R1-2302630 "Evaluation of ML for beam management" by Nokia, Nokia Shanghai Bell, Apr. 2023, pp. 1-41, 3GPP TSG RAN WG1 #112bis-e. (Year: 2023).*

* cited by examiner

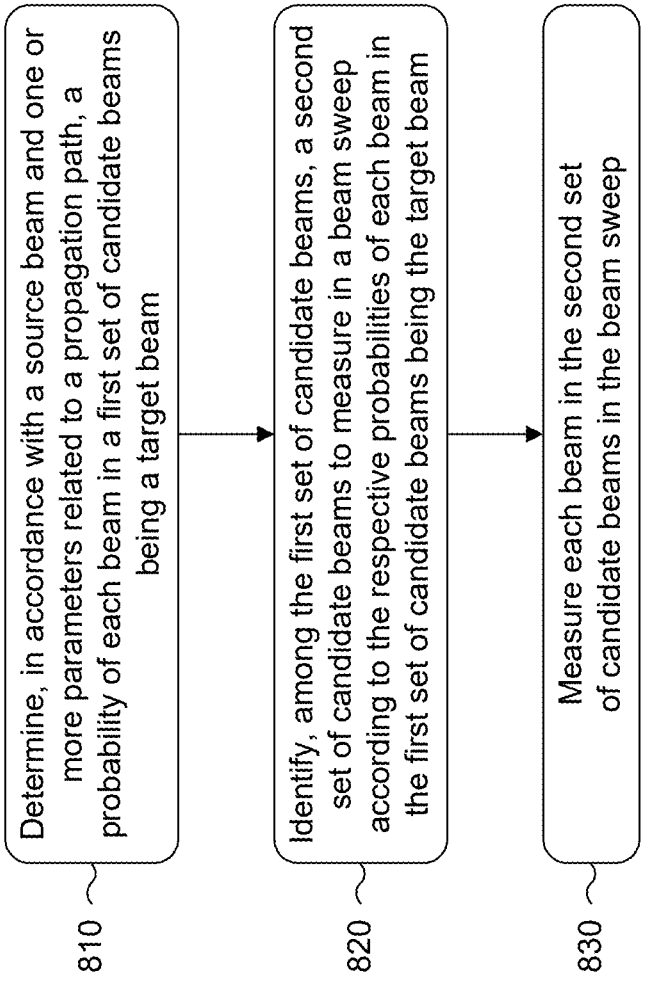

Determine, in accordance with a source beam and one or more parameters related to a propagation path, a probability of each beam in a first set of candidate beams being a target beam

810

Identify, among the first set of candidate beams, a second set of candidate beams to measure in a beam sweep according to the respective probabilities of each beam in the first set of candidate beams being the target beam

820

Measure each beam in the second set of candidate beams in the beam sweep

BEAM MANAGEMENT WITH PROBABILISTIC BEAM RELATIONS

FIELD OF THE DISCLOSURE

Aspects of the present disclosure generally relate to wireless communication and specifically relate to techniques, apparatuses, and methods associated with beam management with probabilistic beam relations.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmW or mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

In some cases, a user equipment (UE) and a network node may use beamforming or spatial filters to improve performance associated with downlink and/or uplink communication over a mmW channel. For example, a mmW channel may suffer from high propagation loss because mmW signals have a higher frequency and a shorter wavelength than various other radio waves used for communications, such as sub-6 gigahertz (GHz) communications. As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (for example, a hand blocking an antenna module when a device is operated in a gaming mode). Accordingly, beamforming or spatial filters may be used at both the UE and the network node to counter the propagation loss in a mmW channel and thereby improve performance for mmW communication.

For example, beams may be formed at the UE and the network node using analog beamforming or other suitable techniques such that each beam points in a specific direction. Accordingly, to achieve a beamforming gain on a downlink, a network node may generate a downlink transmit beam that is steered in a particular direction (for example, toward a cluster that reflects in a direction toward the UE), and the UE may generate a corresponding downlink receive beam. Similarly, to achieve a beamforming gain on an uplink, the UE may generate an uplink transmit beam that is steered in a particular direction, and the network node may generate a corresponding uplink receive beam. In some cases, the UE may be permitted to select the downlink receive beam to optimize reception of a downlink transmission from the network node and/or may be permitted to select the uplink transmit beam to optimize reception at the network node for an uplink transmission by the UE. For example, to verify or search for the best beam, the UE may perform a beam sweep to measure a set of candidate beams and select a beam that has a best measurement. In some cases, the set of candidate beams may include each directional beam supported by the UE, or a subset of the directional beams that may be determined according to beam patterns (for example, hierarchical beam structures and/or adjacent beam relations). However, sweeping over each directional beam supported by the UE, or an arbitrary set of candidate beams, may consume significant power, incur large delays, and/or result in the UE mistracking the best candidate beam, especially when the set of candidate beams evaluated in a beam management procedure is large or does not contain the best beam.

SUMMARY

Some aspects described herein relate to a user equipment (UE) for wireless communication. The UE may include one or more memories storing processor readable code and one or more processors coupled with the one or more memories. The one or more processors may be individually or collectively operable to cause the user equipment to determine, in accordance with a source beam and one or more parameters related to a propagation path, a probability of each beam in a first set of candidate beams being a target beam. The one or more processors may be individually or collectively operable to cause the user equipment to identify, among the first set of candidate beams, a second set of candidate beams to measure in a beam sweep according to the respective probabilities of each beam in the first set of candidate beams being the target beam. The one or more processors may be individually or collectively operable to cause the user equipment to measure each beam in the second set of candidate beams in the beam sweep.

Some aspects described herein relate to a method of wireless communication performed by a UE. The method may include determining, in accordance with a source beam and one or more parameters related to a propagation path, a probability of each beam in a first set of candidate beams being a target beam. The method may include identifying, among the first set of candidate beams, a second set of candidate beams to measure in a beam sweep according to the respective probabilities of each beam in the first set of candidate beams being the target beam. The method may include measuring each beam in the second set of candidate beams in the beam sweep.

Some aspects described herein relate to a non-transitory computer-readable medium that stores a set of instructions for wireless communication by a UE. The set of instructions, when executed by one or more processors of the UE, may cause the UE to determine, in accordance with a source beam and one or more parameters related to a propagation path, a probability of each beam in a first set of candidate beams being a target beam. The set of instructions, when executed by one or more processors of the UE, may cause the UE to identify, among the first set of candidate beams, a second set of candidate beams to measure in a beam sweep according to the respective probabilities of each beam in the first set of candidate beams being the target beam. The set of instructions, when executed by one or more processors of the UE, may cause the UE to measure each beam in the second set of candidate beams in the beam sweep.

Some aspects described herein relate to an apparatus for wireless communication. The apparatus may include means for determining, in accordance with a source beam and one or more parameters related to a propagation path, a probability of each beam in a first set of candidate beams being a target beam. The apparatus may include means for identifying, among the first set of candidate beams, a second set of candidate beams to measure in a beam sweep according to the respective probabilities of each beam in the first set of candidate beams being the target beam. The apparatus may include means for measuring each beam in the second set of candidate beams in the beam sweep.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 8 is a flowchart illustrating an example process performed, for example, by a UE in accordance with the present disclosure.

DETAILED DESCRIPTION

Figure 1:
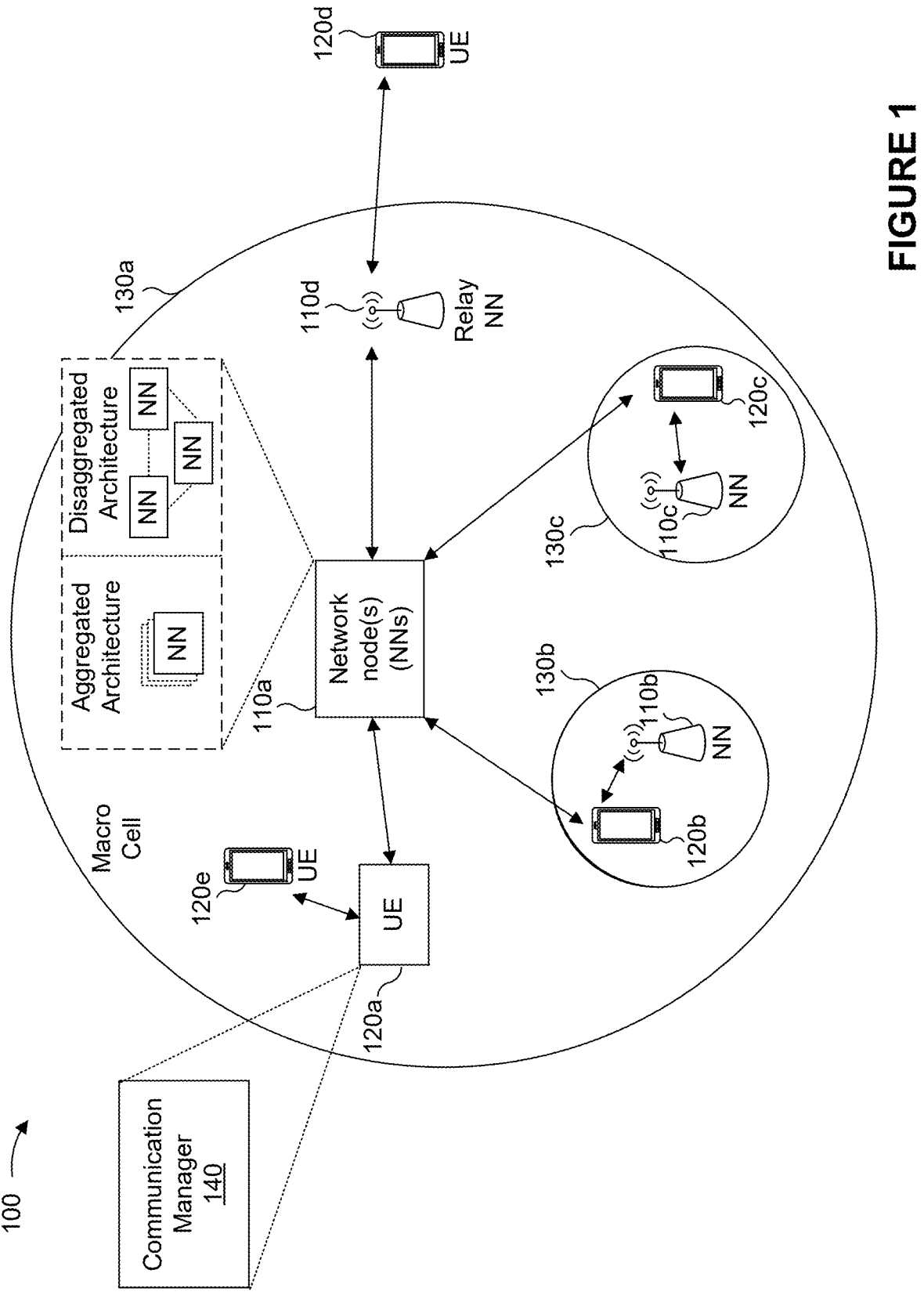
FIG. 1 is a diagram illustrating an example of a wireless network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to utilizing soft information or side information to prioritize a set of candidate beams that are measured or otherwise evaluated in a beam management procedure. Some aspects more specifically relate to a user equipment (UE) determining a probability of each beam in an initial set of candidate beams being a target beam (for example, a best beam given current channel conditions) according to a current source beam and one or more parameters that relate to a propagation path from a transmitter (for example, a dominant or non-dominant propagation path from a network node or another UE) to the UE. For example, in some aspects, the parameters related to the propagation path may include parameters that relate to an effective rotation, angular velocity, and/or angular displacement or angular orientation of the UE (for example, parameters that are obtained using one or more inertial measurement units (IMUs)) and/or parameters that relate to beam shapes (for example, an azimuth, an elevation, and/or beamforming gains at various angles around the UE), among other examples. Accordingly, in some aspects, the UE may select, among the beams included in the initial set of candidate beams, a set of candidate beams to be measured or otherwise evaluated in a beam management procedure according to the respective probabilities of each candidate beam being the target beam (for example, a new source beam or serving beam). For example, in some aspects, the set of candidate beams may include N candidate beams that have a highest probability of being the target beam and/or each candidate beam associated with a probability that satisfies a threshold.

Particular aspects of the subject matter described in this disclosure can be implemented to realize one or more of the following potential advantages. In some examples, the described techniques can be used to configure an optimized set of candidate beams that are most probable to be a best serving beam, which may allow the UE to avoid measuring or evaluating one or more candidate beams that are relatively less probable of being the best serving beam and/or ensure that candidate beams that are more probable of being the best serving beam are measured or otherwise evaluated in a beam management procedure. Additionally, in some examples, the described techniques can be used to reduce the total quantity of candidate beams that are measured or evaluated in a beam management procedure, which may reduce power consumption at the UE and/or reduce a latency associated with selecting and/or switching to a best serving beam. Furthermore, in some examples, the described techniques can be used to improve performance associated with beamformed communications by increasing a likelihood that the set of candidate beams includes the best serving beam, particularly in scenarios where a channel may evolve over time due to a UE moving and/or rotating.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, in accordance with user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) in accordance with changing network conditions in the wireless communication network 100 and/or in accordance with the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced cMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (cMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or cMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120c) may communicate directly with one another using sidelink communications (for example, without communicating by way of a network node 110 as an intermediary). As an example, the UE 120a may directly transmit data, control information, or other signaling as a sidelink communication to the UE 120c. This is in contrast to, for example, the UE 120a first transmitting data in an UL communication to a network node 110, which then transmits the data to the UE 120c in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may determine, in accordance with a source beam and one or more parameters related to a propagation path, a probability of each beam in a first set of candidate beams being a target beam; identify, among the first set of candidate beams, a second set of candidate beams to measure in a beam sweep according to the respective probabilities of each beam in the first set of candidate beams being the target beam; and measure each beam in the second set of candidate beams in the beam sweep. Additionally, or alternatively, the communication manager 140 may perform one or more other operations described herein.

Figure 2:
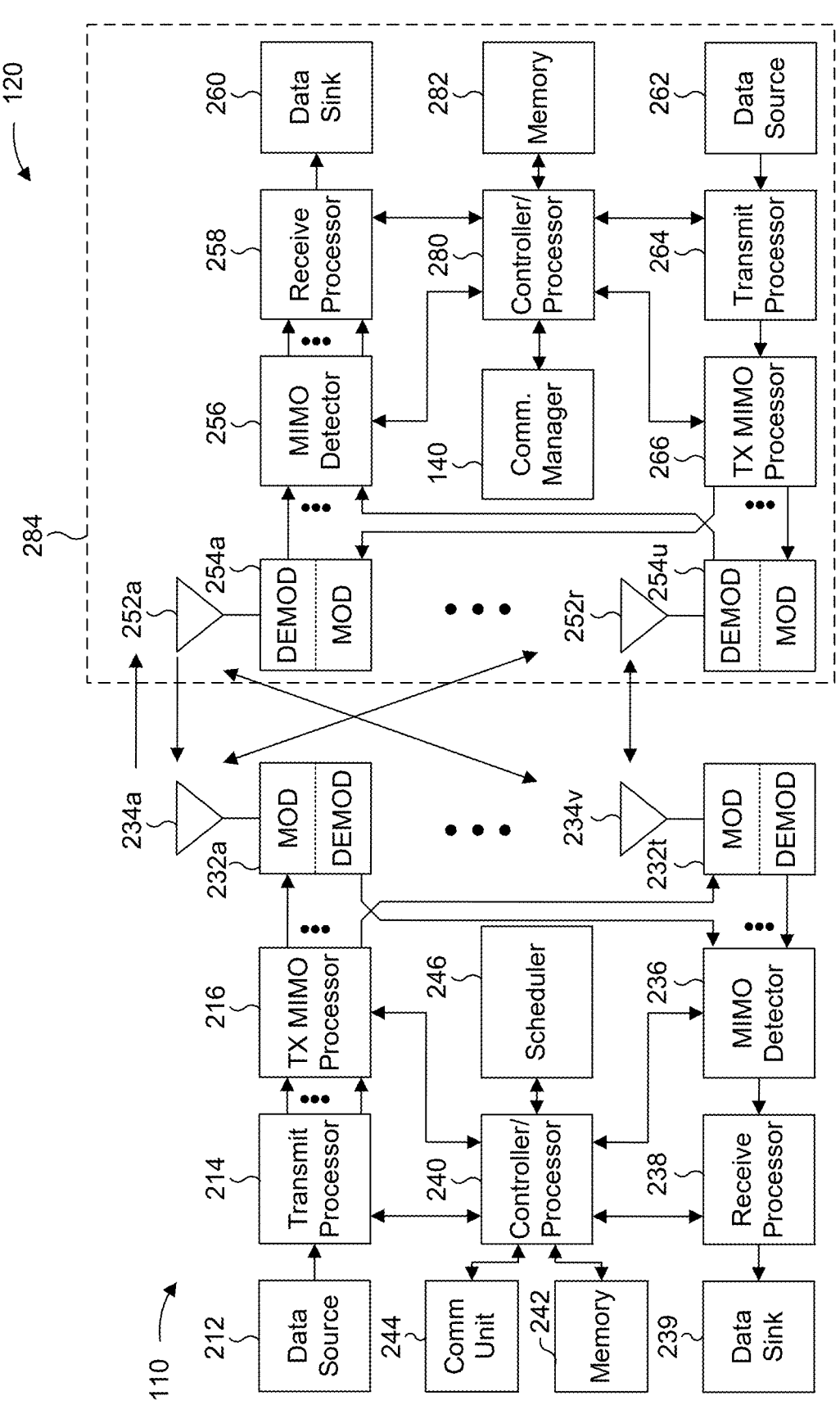
FIG. 2 is a diagram illustrating an example network node in communication with a user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP- OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
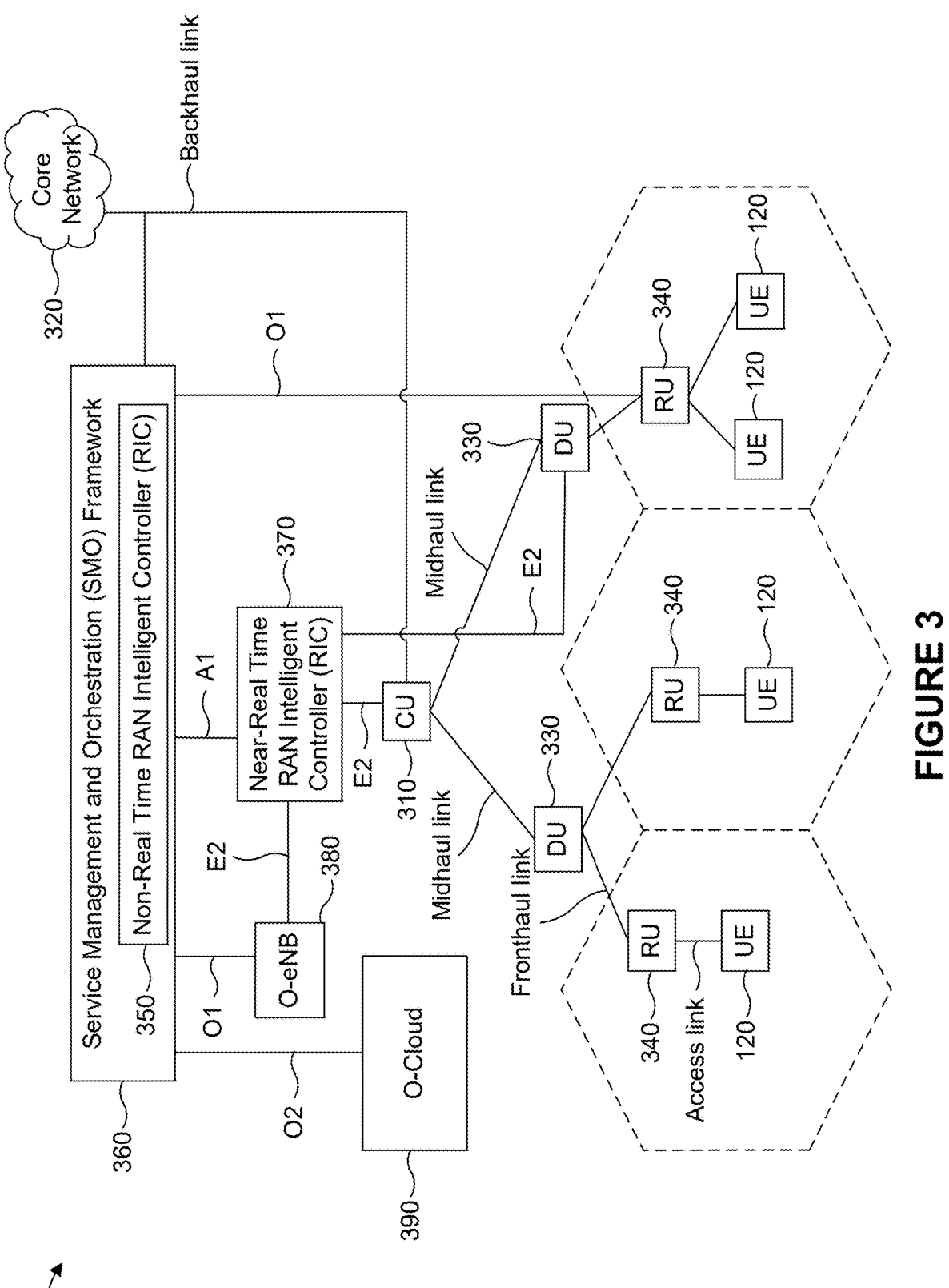
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with beam management with probabilistic beam relations, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8 or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8 or other processes as described herein. In some examples, executing instructions may include running the instructions, converting the instructions, compiling the instructions, and/or interpreting the instructions, among other examples.

In some aspects, the UE 120 includes means for determining, in accordance with a source beam and one or more parameters related to a propagation path, a probability of each beam in a first set of candidate beams being a target beam; means for identifying, among the first set of candidate beams, a second set of candidate beams to measure in a beam sweep according to the respective probabilities of each beam in the first set of candidate beams being the target beam; and/or means for measuring each beam in the second set of candidate beams in the beam sweep. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
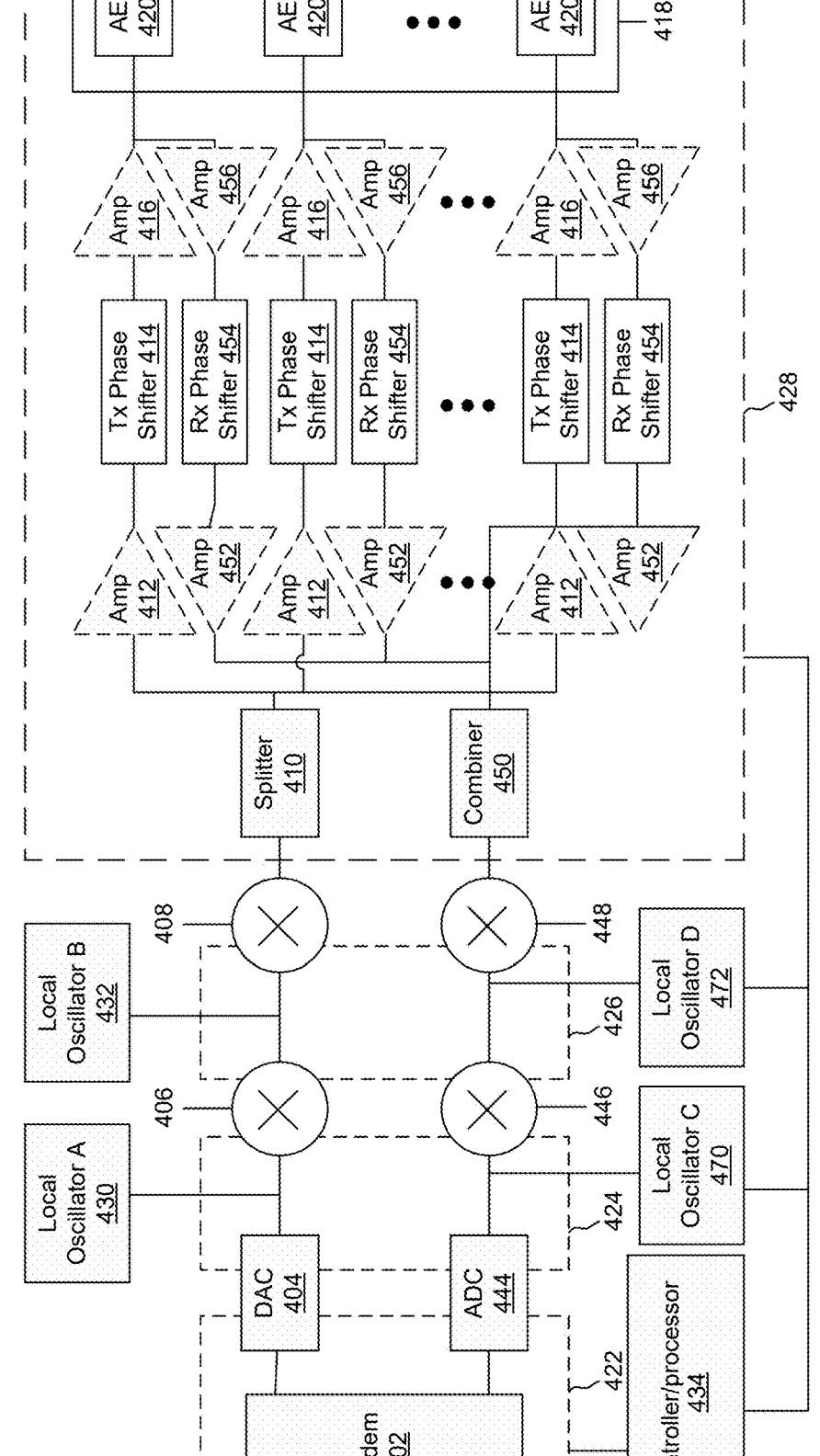
FIG. 4 is a diagram illustrating an example beamforming architecture that supports beamforming for millimeter wave communications in accordance with the present disclosure.

FIG. 4 is a diagram illustrating an example beamforming architecture 400 that supports beamforming for mmW communications, in accordance with the present disclosure. In some aspects, architecture 400 may implement aspects of wireless network 100. In some aspects, architecture 400 may be implemented in a transmitting device (for example, a first wireless communication device, a UE, or a network node) and/or a receiving device (for example, a second wireless communication device, a UE, or a network node), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (for example, to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (for example, by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (for example, for TDD operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (for example, not connected to a power source), which may result in some insertion loss. The combiner 450 may be an active combiner (for example, connected to a power source), which may result in some signal gain. When combiner 450 is an active combiner, it may provide a different (for example, configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an ADC 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (for example, represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (for example, for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

Figure 5:
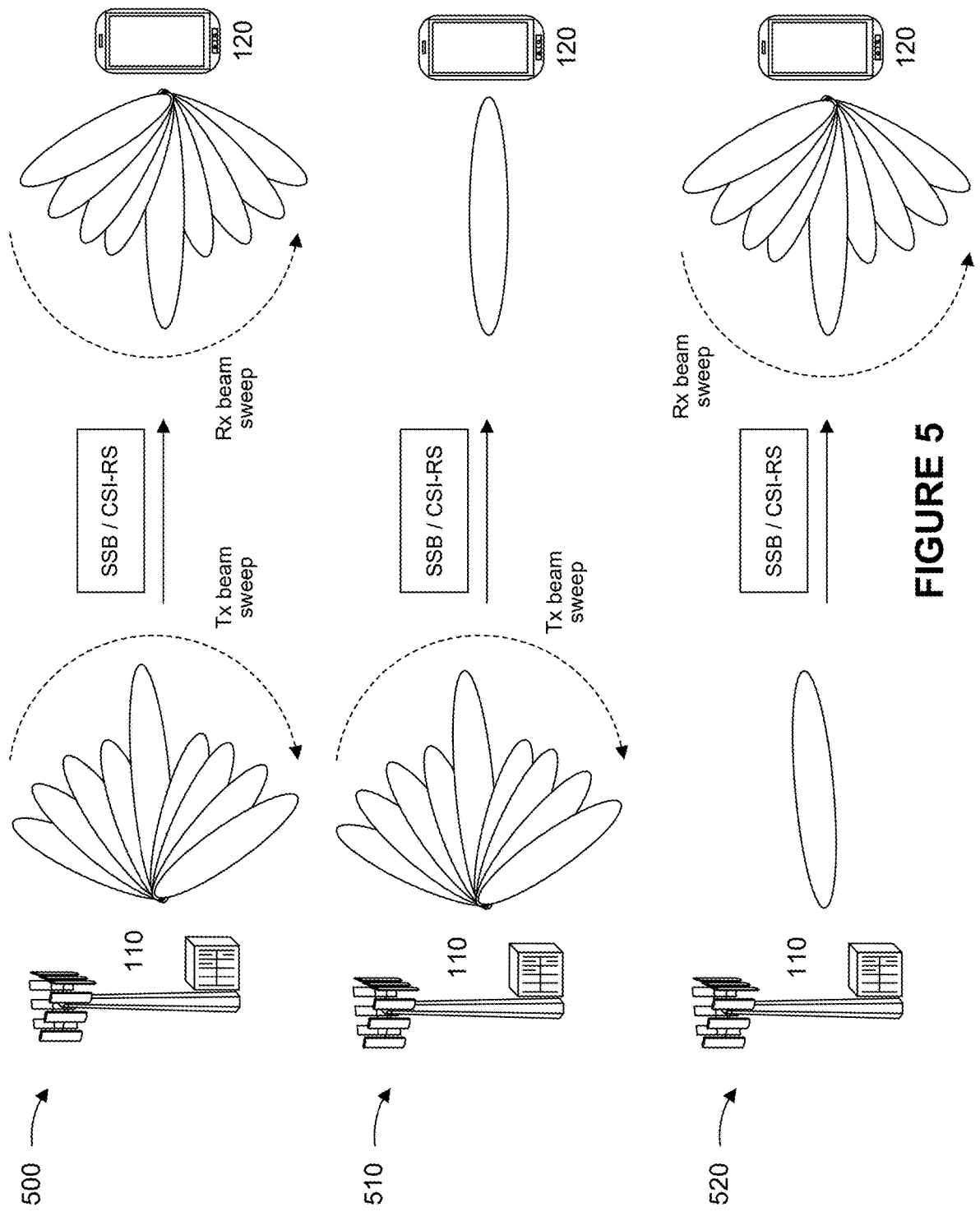
FIG. 5 is a diagram illustrating examples of beam management procedures, in accordance with the present disclosure.

FIG. 5 is a diagram illustrating examples 500, 510, and 520 of beam management procedures in accordance with the present disclosure. As shown in FIG. 5, examples 500, 510, and 520 include a UE 120 in communication with a network node 110 in a wireless network (for example, wireless network 100). However, the devices shown in FIG. 5 are provided as examples, and the wireless network may support communication and beam management between other devices (for example, between a UE 120 and a TRP, DU, or RU, between a mobile termination node and a control node, between an IAB child node and an IAB parent node, and/or between a scheduled node and a scheduling node). In some aspects, the UE 120 and the network node 110 may be in a connected state (for example, an RRC connected state) when performing the beam management procedure(s).

As shown in FIG. 5, example 500 may include the network node 110 and the UE 120 communicating to perform beam management using synchronization signal block (SSB) transmissions or CSI-RS transmissions. Example 500 depicts a first beam management procedure (for example, P1 beam management). The first beam management procedure may be referred to as a beam selection procedure, an initial beam acquisition procedure, a beam sweeping procedure, a cell search procedure, and/or a beam search procedure. As shown in FIG. 5 and example 500, SSBs and/or CSI-RSs may be configured to be transmitted from the network node 110 to the UE 120 during the first beam management procedure. For example, an SSB transmitted by the network node 110 is a single rank (rank-1) periodic reference signal that is always transmitted by the network node 110 to enable initial network acquisition and synchronization in addition to beam selection and beam management. For example, an identifier associated with an SSB may have a one-to-one mapping to a transmit beam used by the network node 110, and the one-to-one mapping may be invariant (for example, static) over time. Additionally, or alternatively, in cases where CSI-RS transmissions are used for the first beam management procedure, the CSI-RSs used for beam selection or beam management may be configured to be periodic (for example, using RRC signaling), semi-persistent (for example, using MAC-CE signaling), and/or aperiodic (for example, using DCI).

The first beam management procedure may include the network node 110 performing a beam sweep over multiple transmit (Tx) beams. The network node 110 may transmit an SSB or a CSI-RS using each transmit beam for beam management. To enable the UE 120 to perform receive (Rx) beam sweeping, the network node 110 may use a transmit beam to transmit (for example, with repetitions) each SSB or CSI-RS at multiple times within the same reference signal resource set so that the UE 120 can perform a beam sweep over multiple receive beams in multiple transmission instances. For example, if the network node 110 has a set of N transmit beams and the UE 120 has a set of M receive beams, the SSB or CSI-RS may be transmitted on each of the N transmit beams M times such that the UE 120 may receive M instances of the SSB or CSI-RS per transmit beam. In other words, for each transmit beam of the network node 110, the UE 120 may perform a beam sweep through the receive beams of the UE 120. As a result, the first beam management procedure may enable the UE 120 to measure an SSB or CSI-RS on different transmit beams using different receive beams to support selection of one or more transmit/receive beam pair(s) (for example, a pairing between a transmit beam of the network node 110 and a receive beam of the UE 120). The UE 120 may report the measurements to the network node 110 to enable the network node 110 to select one or more beam pairs for communication between the network node 110 and the UE 120.

As shown in FIG. 5, example 510 may include the network node 110 and the UE 120 communicating to perform beam management using SSB transmissions or CSI-RS transmissions. Example 510 depicts a second beam management procedure (for example, P2 beam management). The second beam management procedure may be referred to as a beam refinement procedure, a base station beam refinement procedure, a network node beam refinement procedure, and/or a transmit beam refinement procedure, among other examples. As shown in FIG. 5 and example 510, SSBs and/or CSI-RSs may be configured to be transmitted from the network node 110 to the UE 120. The SSBs may be periodic, and the CSI-RSs may be configured to be aperiodic (for example, using DCI). The second beam management procedure may include the network node 110 performing a beam sweep over one or more transmit beams. The one or more transmit beams may be a subset of all transmit beams associated with the network node 110 (for example, determined according to measurements reported by the UE 120 in connection with the first beam management procedure). The network node 110 may transmit an SSB or a CSI-RS using each transmit beam of the one or more transmit beams for beam management. The UE 120 may measure each SSB or CSI-RS using a single (for example, a same) receive beam (for example, determined according to measurements performed in connection with the first beam management procedure). The second beam management procedure may enable the network node 110 to select a best transmit beam according to measurements of the SSBs and/or CSI-RSs (for example, measured by the UE 120 using the single receive beam) reported by the UE 120.

As shown in FIG. 5, example 520 depicts a third beam management procedure (for example, P3 beam management). The third beam management procedure may be referred to as a beam refinement procedure, a UE beam refinement procedure, a receive beam refinement procedure, and/or a UE beam management procedure, among other examples. As shown in FIG. 5 and example 520, one or more SSBS or CSI-RSs may be configured to be transmitted from the network node 110 to the UE 120. The SSBs may be configured to be periodic, and the CSI-RSs may be configured to be aperiodic (for example, using DCI). The third beam management process may include the network node 110 transmitting the one or more SSBs or CSI-RSs using a single transmit beam (for example, determined according to measurements reported by the UE 120 in connection with the first beam management procedure and/or the second beam management procedure). To enable the UE 120 to perform receive beam sweeping, the network node 110 may use a transmit beam to transmit (for example, with repetitions) an SSB or CSI-RS at multiple times within the same reference signal resource set such that UE 120 can sweep through one or more receive beams in multiple transmission instances. The one or more receive beams may be a subset of all receive beams associated with the UE 120 (for example, determined according to measurements performed in connection with the first beam management procedure and/or the second beam management procedure). The third beam management procedure may enable the UE 120 to select a best receive beam according to measurements of the SSBs or CSI-RSs and/or may enable the network node 110 to select a best receive beam for the UE 120 according to reported measurements received from the UE 120 (for example, measurements of the SSB and/or CSI-RS using the one or more receive beams).

Figure 6:
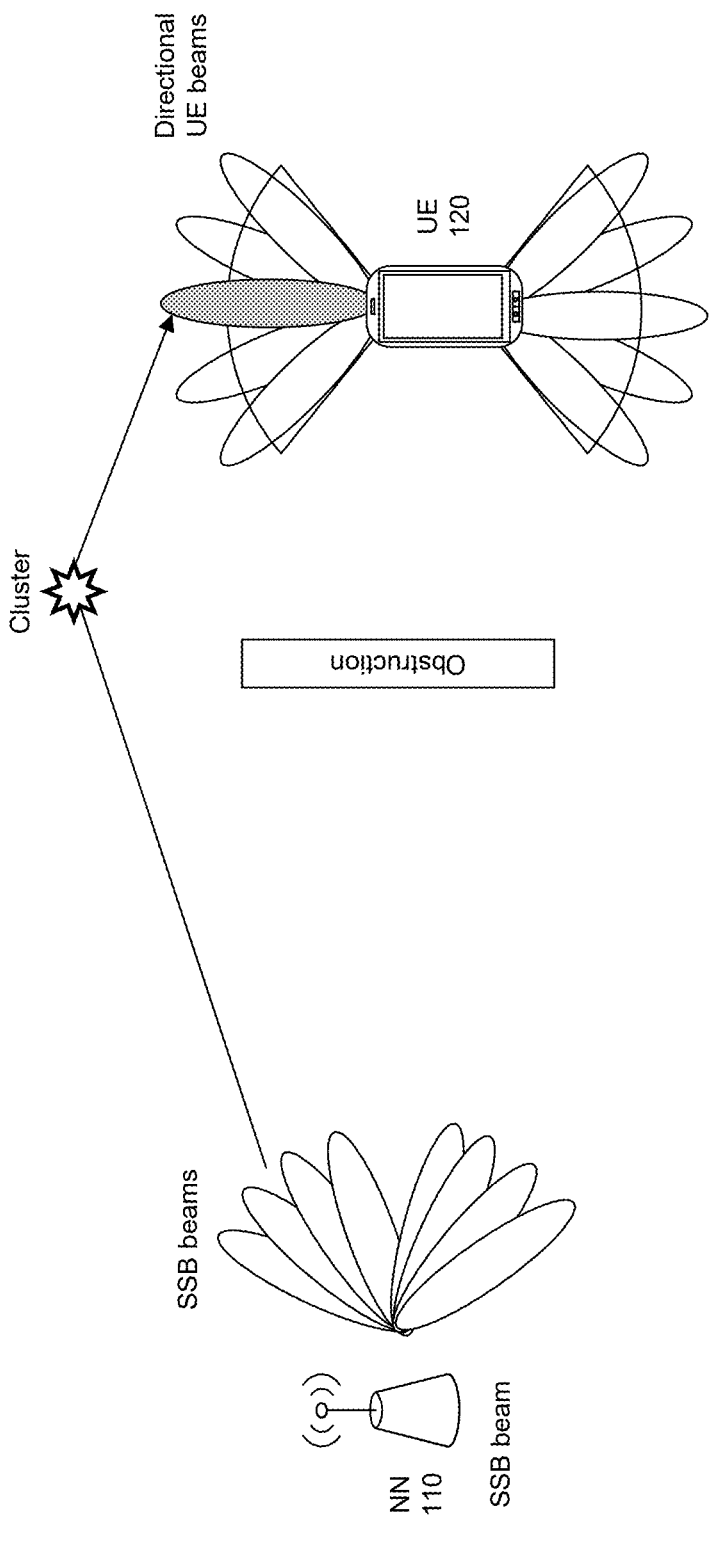
FIG. 6 is a diagram illustrating an example of beam sweeping to measure a set of candidate beams in accordance with the present disclosure.

FIG. 6 is a diagram illustrating an example 600 of beam sweeping to measure a set of candidate beams in accordance with the present disclosure. As shown in FIG. 6, example 600 includes a UE 120 in communication with a network node 110 in a wireless network (for example, wireless network 100).

In some cases, as described herein, the UE 120 and the network node 110 may use beamforming to improve performance associated with downlink and/or uplink communication over a mmW channel. For example, a mmW channel (for example, in FR2 and/or FR4) may suffer from high propagation loss because mmW signals have a higher frequency and a shorter wavelength than various other radio waves used for communications (for example, sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, as shown in FIG. 6, a mmW signal may reflect off a cluster (for example, a lamp post, a vehicle, glass or a window, and/or a metallic object, among other examples), may be diffracted by edges or corners of buildings and/or walls, may be scattered via irregular objects such as walls and/or human bodies (for example, a hand blocking an antenna module when a device is operated in a gaming mode), and/or may be blocked by one or more obstructions.

Accordingly, as shown in FIG. 6, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction, and the network node 110 may generate a corresponding uplink receive beam. In some cases, the UE 120 may be permitted to select the downlink receive beam to optimize reception of a downlink transmission from the network node 110 and/or may be permitted to select the uplink transmit beam to optimize reception at the network node 110 for an uplink transmission by the UE 120.

In some aspects, the UE 120 and the network node 110 may perform one or more beam management procedures to select or otherwise configure respective serving beams that are used for beamformed communication over a mmW channel or another suitable wireless channel. For example, as described herein, the UE 120 and the network node 110 may perform a beam management procedure, such as a P1 beam management procedure and/or a P3 beam management procedure, in which the UE 120 measures various candidate beams in a beam sweep. For example, the beam management procedure may be performed to initially select or otherwise configure a serving beam and/or to switch from a current serving beam (or source beam) to a target beam (for example, when the UE 120 moves, rotates, changes orientation, changes velocity, and/or conditions associated with the wireless channel between the network node 110 and the UE 120 otherwise evolves). For example, to verify or search for the best beam, the UE 120 may perform a beam sweep to measure a set of candidate beams and select a beam that has a best measurement, such as a highest RSRP measurement. In some cases, the set of candidate beams may include each directional beam supported by the UE 120, or a subset of the directional beams that may be determined according to beam patterns (for example, hierarchical beam structures and/or adjacent beam relations). However, sweeping over each directional beam, or an arbitrary set of candidate beams, may consume significant power, incur large delays, and/or result in the UE 120 mistracking the best candidate beam, especially when the set of candidate beams evaluated in a beam management procedure is large or does not contain the best beam.

Accordingly, various aspects described herein relate generally to utilizing soft information or side information to prioritize a set of candidate beams that a UE 120 measures or otherwise evaluates in a beam management procedure. Some aspects more specifically relate to a UE 120 determining a probability of each beam in an initial set of candidate beams being a target beam (for example, a best beam given current channel conditions) according to a current source beam and one or more parameters that relate to a propagation path from a transmitter (for example, a network node 110 or another UE 120) to the UE 120. For example, in some aspects, the parameters related to the propagation path may include parameters that relate to an effective rotation, angular velocity, or angular displacement or orientation of the UE 120 and/or parameters that relate to beam shapes, among other examples. Accordingly, the UE 120 may select, among the beams included in the initial set of candidate beams, a set of candidate beams to be measured or otherwise evaluated in a beam management procedure according to the respective probabilities of each candidate beam being the target beam (for example, a new source beam or serving beam). For example, in some aspects, the set of candidate beams may include N candidate beams that have a highest probability of being the target beam and/or each candidate beam associated with a probability that satisfies a threshold.

In this way, some aspects described herein can be used to configure an optimized set of candidate beams that are most probable to be a best serving beam, which may allow the UE 120 to avoid measuring or evaluating one or more candidate beams that are relatively less probable of being the best serving beam and/or ensure that candidate beams that are more probable of being the best serving beam are measured or otherwise evaluated in a beam management procedure. Additionally, in some examples, the described techniques can be used to reduce the total quantity of candidate beams that are measured or evaluated in a beam management procedure, which may reduce power consumption at the UE 120 and/or reduce a latency associated with selecting and/or switching to a best serving beam. Furthermore, in some examples, the described techniques can be used to improve performance associated with beamformed communications by increasing a likelihood that the set of candidate beams includes the best serving beam, particularly in scenarios where a channel may evolve over time due to a UE 120 moving and/or rotating and/or due to other changes in a wireless propagation path from the transmitter to the UE 120 (for example, changes in weather and/or movement of objects within a surrounding environment, among other examples).

Figure 7:
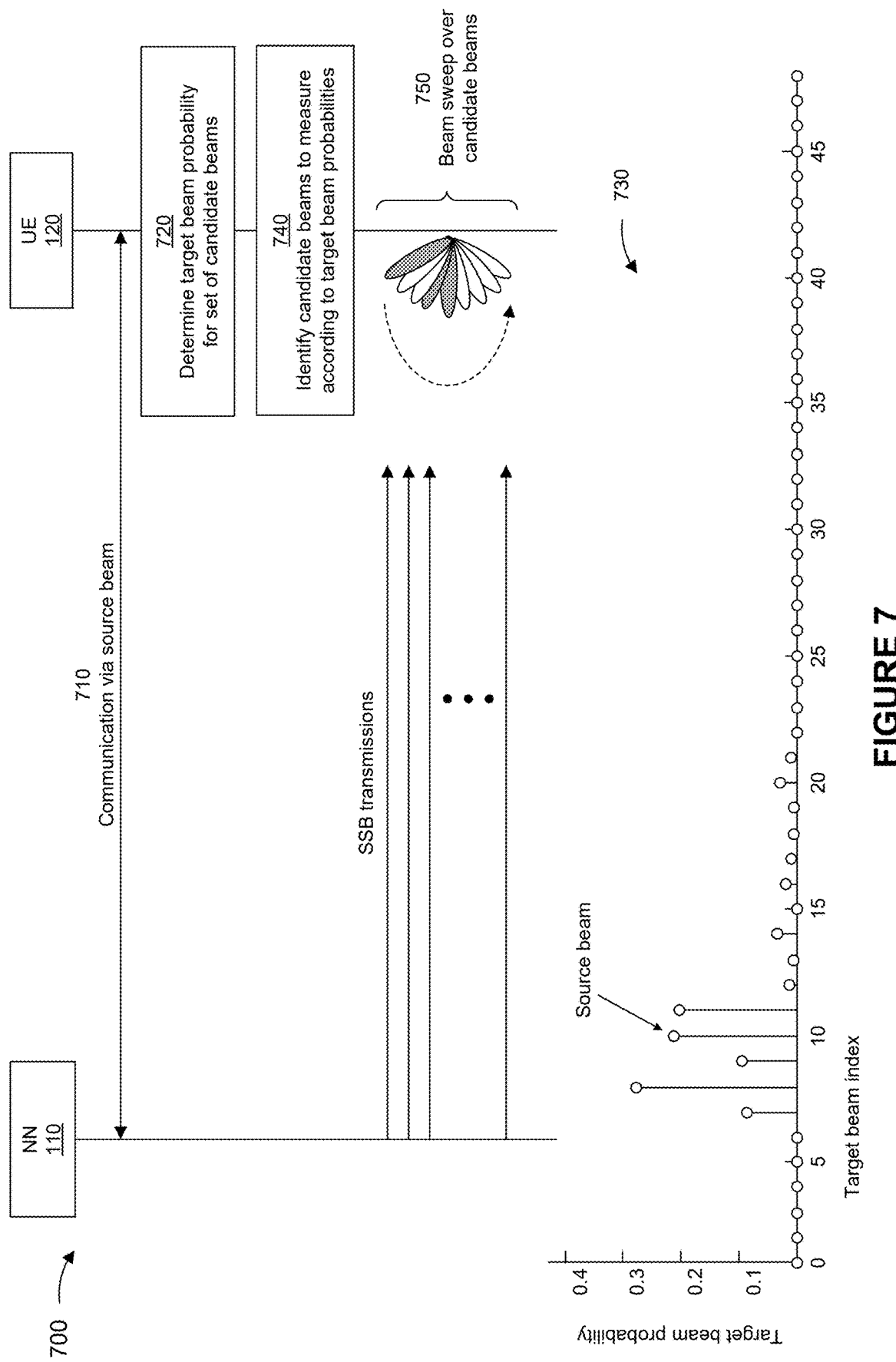
FIG. 7 is a diagram illustrating an example associated with beam management with probabilistic beam relations in accordance with the present disclosure.

FIG. 7 is a diagram illustrating an example 700 associated with beam management with probabilistic beam relations in accordance with the present disclosure. As shown in FIG. 7, example 700 includes a UE 120 in communication with a network node 110 in a wireless network (for example, wireless network 100). Additionally or alternatively, the techniques described herein example 700 may apply to communication between the UE 120 and another transmitter, such as another UE 120 in the case of sidelink communication.

As shown in FIG. 7, in a first operation 710, the UE 120 and the network node 110 may communicate via a source beam, or current serving beam. For example, in some aspects, the UE 120 and the network node 110 may perform one or more beam management procedures, such as a P1 beam management procedure, a P2 beam management procedure, and/or a P3 beam management procedure, to select a beam that the UE 120 uses to receive communications from the network node 110 and/or to transmit communications to the network node 110. For example, the beam management procedure may be a beam selection procedure, an initial beam acquisition procedure, a beam sweeping procedure, a cell search procedure, and/or a beam search procedure, in which the network node 110 performs a Tx beam sweep over multiple transmit beams and the UE 120 performs an Rx beam sweep over a set of candidate beams. In some aspects, the set of candidate beams associated with the beam sweep may include each candidate beam supported by the UE 120, or a subset of the candidate beams supported by the UE 120. Additionally or alternatively, the beam management procedure may be a beam refinement procedure, a base station beam refinement procedure, a network node beam refinement procedure, and/or a transmit beam refinement procedure, in which the network node 110 performs a beam sweep over one or more transmit beams (for example, a subset of all transmit beams associated with the network node 110). Additionally or alternatively, the beam management procedure may be a beam refinement procedure, a UE beam refinement procedure, a receive beam refinement procedure, and/or a UE beam management procedure, in which the network node 110 transmits one or more SSBs or CSI-RSs multiple times using a single transmit beam such that UE 120 can sweep through one or more receive beams in a set of candidate beams in multiple transmission instances (for example, a subset of all receive beams associated with the UE 120). Accordingly, the UE 120 and the network node 110 may generally perform the one or more beam management procedures to select the best serving beam or source beam (for example, transmit and/or receive beam) to use to communicate with the network node 110 given current channel conditions.

As further shown in FIG. 7, in a second operation 720, the UE 120 may determine, for each beam in a set of candidate beams, a respective probability of the beam being a target beam (for example, a new or next serving beam). In some aspects, the UE 120 may determine the probability of each candidate beam being the target beam at periodic intervals and/or in accordance with one or more triggering events. For example, in some aspects, the one or more triggering events may include one or more events that trigger a beam management procedure, such as a measurement associated with the current serving beam failing to satisfy a threshold, or one or more events that relate to movement or a change in a velocity, displacement, or orientation of the UE 120 (for example, detected using one or more IMUs or other suitable sensors). For example, the triggering events may generally indicate that conditions associated with a propagation path between the UE 120 and the network node 110 have changed or evolved, and/or may be associated with a prediction (for example, using AI/ML techniques) that the conditions associated with the propagation path between the UE 120 and the network node 110 will change or evolve. In some aspects, in cases where the UE 120 is to determine the probability of each candidate beam in the set of candidate beams being the target beam, the set of candidate beams to be evaluated may include all of the directional beams associated with the UE 120, or a subset of the directional beams associated with the UE 120. For example, in some aspects, the set of candidate beams may include each candidate beam within a directional window associated with the current serving beam (for example, each directional beam associated with the UE 120 that is within a 30 degree window, a 45 degree window, a 60 degree window, a 90 degree window, a 180 degree window, or another suitable window centered around the current serving beam).

In some aspects, when the UE 120 determines the probability of each candidate beam in the set of candidate beams being the target beam, the UE 120 may determine the respective probabilities with respect to each SSB beam, CSI-RS beam, or other beam that the network node 110 uses to transmit a reference signal to the UE 120. For example, if the set of candidate beams includes M candidate beams and the network node 110 transmits using N SSB beams, the UE 120 may determine N probabilities for each of the M candidate beams. Accordingly, as described herein, the UE 120 may generally determine, for each beam in the set of candidate beams, a probability of the candidate beam being the best beam at a given time with respect to a particular beam associated with the network node 110. Furthermore, as described herein, the UE 120 may determine the respective probabilities for each beam in accordance with the current serving beam (for example, beams within a limited directional window of the current serving beam) and in accordance with one or more parameters that relate to (for example, potentially have an impact on) the propagation path between the network node 110 and the UE 120. For example, when the UE 120 moves, rotates, changes velocity, or changes orientation, or environmental conditions otherwise cause a change in channel conditions, an angle of arrival (AoA) of the propagation path may evolve. As described herein, the evolution in the propagation path may be experienced at the UE 120 as an effective rotation of the propagation path. Accordingly, the UE 120 may use side information that includes one or more parameters related to the propagation path in addition to the current serving beam (or source beam) to identify, among the set of candidate beams, a subset of the candidate beams that are most likely to become a best beam (for example, a target beam).

For example, in some aspects, the parameters related to the propagation path may be used to define effective beam adjacencies and beam relations, relative to the current serving beam. For example, in some aspects, the parameters that are used to determine the probabilities of each candidate beam becoming the target beam may include previous measurements associated with each candidate beam (for example, an RSRP measurement for each candidate beam, with respect to each beam associated with the network node 110). Additionally, or alternatively, in some aspects, the parameters that are used to determine the probabilities of each candidate beam becoming the target beam may include one or more parameters that relate to a shape of each candidate beam. For example, each candidate beam associated with the UE 120 may be an analog beam associated with weightings that may be designed offline to configure a particular beam shape and/or beam pattern. Accordingly, in some aspects, the parameters that relate to the shape of each candidate beam may include parameters such as a beamforming gain as a function of an AoA of a wireless signal from the network node 110 on a sphere around the UE 120, an azimuth and elevation of the candidate beam within a suitable coordinate system, and/or a beam response or beam width that may be a function of the azimuth and/or the elevation of the candidate beam.

Additionally, or alternatively, in some aspects, the parameters that are used to determine the probabilities of each candidate beam becoming the target beam may include one or more parameters that relate to a position and/or movement of the UE 120 (for example, a rotation direction, a rotation speed, a rotation duration, a rotation axis, an angular velocity, and/or an angular displacement or orientation of the UE 120, which may be measured using one or more IMUs or other suitable techniques). For example, when the UE 120 moves or rotates, or the angular velocity, displacement, or orientation of the UE 120 otherwise changes, the angle of the propagation path may change and influence which candidate beam is the best beam at the current time. Accordingly, in some aspects, the parameters that are used to determine the probabilities of each candidate beam becoming the target beam may include one or more parameters related to the position and/or movement of the UE 120, such as a rotation direction, a rotation speed, a rotation duration, a rotation axis, an angular velocity, and/or an angular displacement or orientation of the UE 120 as a function of time. In some aspects, the parameters related to the position or movement of the UE 120 may be obtained using one or more IMUs or other suitable sensors associated with the UE 120, which may be estimated taking into account calibration errors associated with the one or more sensors (for example, to account for potentially noisy or infrequent sensor measurements).

Accordingly, as described herein, the UE 120 may determine, for each beam in a set of candidate beams, a probability of each respective beam being or becoming a target beam, where the set of candidate beams may include all directional beams of the UE 120, a subset of the candidate beams that are within a directional widow of the current serving beam, and/or a subset of the candidate beams that are effectively adjacent to or otherwise related to the current serving beam in accordance with the parameters related to beam shapes, beam patterns, beam measurements, and/or the motion or position of the UE 120, among other examples. Furthermore, the set of candidate beams for which the UE 120 determines the respective probabilities of being or becoming the target beam may typically include the current serving beam.

In one example, as shown by reference number 730 in FIG. 7, the UE 120 may determine the respective probabilities of various candidate beams being a target beam. For example, in the example shown by reference number 730, the horizontal axis corresponds to beam indexes associated with various candidate beams, and the vertical axis corresponds to a probability of a beam associated with each beam index being or becoming a target beam in accordance with information related to the current source beam and the parameters that relate to the propagation path. As shown in FIG. 7, a current serving beam or source beam is associated with beam index 10, and probabilities of the current serving beam and other candidate beams being the target beam are derived in accordance with the current serving beam and the parameters related to beam shapes and/or the position or movement of the UE 120 (for example, using AI/ML techniques, or using non-AI/ML techniques where the respective probabilities are derived using one or more functions or rules). As shown in FIG. 7, various candidate beams that are not adjacent to the source beam may a relatively high probability of being the next serving beam (for example, candidate beams associated with beam indexes 7 an 8), while other candidate beams that are direct neighbors of the source beam may have relatively low probabilities of being the next serving beam. Accordingly, considering respective probabilities of candidate beams being the next serving beam may offer performance gains relative to relying solely on beam adjacencies to determine the set of candidate beams to be measured.

As further shown in FIG. 7, in a third operation 740, the UE 120 may identify a set of candidate beams to be measured in a beam sweep according to the target beam probabilities. For example, in some aspects, the set of candidate beams to be measured in the beam sweep may be limited to a subset of the candidate beams for which the UE 120 determined respective probabilities of being the next serving beam. For example, in some aspects, the UE 120 may select, among the initial set of candidate beams, a set of N candidate beams with the highest probabilities to be included in the set of candidate beams to be measured in the beam sweep. Additionally, or alternatively, the set of candidate beams to be measured in the beam sweep may include any candidate beams associated with a probability that satisfies (for example, equals or exceeds) a threshold and/or may exclude any candidate beams associated with a probability that fails to satisfy a threshold. For example, in some aspects, the UE 120 may add a candidate beam to the set of candidate beams to be measured in accordance with the candidate beam being associated with a probability that equals or exceeds a threshold, such as a 0.25 probability or another suitable value. Additionally, or alternatively, the UE 120 may remove a candidate beam from the set of candidate beams to be measured in accordance with the candidate beam being associated with a probability below a threshold, such as a 0.05 probability or another suitable value.

Accordingly, as further shown in FIG. 7, in a fourth operation 750, the UE 120 may perform a beam sweep over the set of candidate beams to be measured during a beam management procedure, and may measure each candidate beam. For example, FIG. 7 illustrates an example beam sweep where the UE 120 only measures the candidate beams shown with a gray fill, in accordance with such candidate beams having relatively higher probabilities of being the target beam. In some aspects, the UE 120 may perform the beam sweep to measure the candidate beam(s) (for example, to obtain RSRP measurements for each candidate beam) with respect to one or more beams associated with the network node 110. For example, in some aspects, the UE 120 may measure each candidate beam in the beam sweep relative to different SSB beams (for example, in a P1 beam management procedure) and/or relative to a single SSB beams (for example, in a P3 beam management procedure), among other examples.

Accordingly, the UE 120 may then select, among the candidate beams that are measured in the beam sweep, a target beam to be used for communication with the network node 110. In this way, by configuring an optimized set of candidate beams that are most probable to be a best serving beam, or otherwise constraining the set of candidate beams that are measured in a beam sweep according to respective probabilities of being the target beam, the UE 120 may avoid measuring or evaluating one or more candidate beams that are relatively less probable of being the best serving beam and/or ensure that candidate beams that are more probable of being the best serving beam are measured or otherwise evaluated more frequently or more often in a beam management procedure. In other words, the quantity of times that a given candidate beam is measured in a beam sweep may be related to the probability of the candidate beam being the best serving beam (with higher probability beams being measured more times). Additionally or alternatively, each candidate beam may be measured in accordance with a time delay related to the probability of the candidate beam being the best serving beam (with higher probability beams being measured earlier than lower probability beams). Additionally, reducing the total quantity of candidate beams that are measured or evaluated in a beam management procedure may reduce power consumption at the UE 120 and/or reduce a latency associated with selecting and/or switching to a best serving beam. Furthermore, as described herein, using the respective probabilities to determine which candidate beams to measure or not measure, and/or how often to measure each candidate beam, may improve performance associated with beamformed communications by increasing a likelihood that the set of candidate beams measured in the beam sweep includes the best serving beam, particularly in scenarios where the wireless channel may evolve over time due to the UE 120 moving and/or rotating and/or due to environmental factors, among other examples.

FIG. 8 is a flowchart illustrating an example process 800 performed, for example, at a UE or an apparatus of a UE that supports beamformed communications in accordance with the present disclosure. Example process 800 is an example where the apparatus or the UE (for example, UE 120) performs operations associated with beam management with probabilistic beam relations.

As shown in FIG. 8, in some aspects, process 800 may include determining, in accordance with a source beam and one or more parameters related to a propagation path, a probability of each beam in a first set of candidate beams being a target beam (block 810). For example, the UE (such as by using communication manager 140 or candidate beam identification component 908, depicted in FIG. 9) may determine, in accordance with a source beam and one or more parameters related to a propagation path, a probability of each beam in a first set of candidate beams being a target beam, as described above.

As further shown in FIG. 8, in some aspects, process 800 may include identifying, among the first set of candidate beams, a second set of candidate beams to measure in a beam sweep according to the respective probabilities of each beam in the first set of candidate beams being the target beam (block 820). For example, the UE (such as by using communication manager 140 or candidate beam identification component 908, depicted in FIG. 9) may identify, among the first set of candidate beams, a second set of candidate beams to measure in a beam sweep according to the respective probabilities of each beam in the first set of candidate beams being the target beam, as described above.

As further shown in FIG. 8, in some aspects, process 800 may include measuring each beam in the second set of candidate beams in the beam sweep (block 830). For example, the UE (such as by using communication manager 140 or beam measurement component 910, depicted in FIG. 9) may measure each beam in the second set of candidate beams in the beam sweep, as described above.

Process 800 may include additional aspects, such as any single aspect or any combination of aspects described below or in connection with one or more other processes described elsewhere herein.

In a first additional aspect, the second set of candidate beams is identified with respect to a reference signal transmitted by a network node.

In a second additional aspect, alone or in combination with the first aspect, the one or more parameters related to the propagation path include an RSRP measurement associated with each beam in the first set of candidate beams.

In a third additional aspect, alone or in combination with one or more of the first and second aspects, the one or more parameters related to the propagation path include one or more parameters related to a beam shape associated with each beam in the first set of candidate beams.

In a fourth additional aspect, alone or in combination with one or more of the first through third aspects, the one or more parameters related to the beam shape include, for each beam in the first set of candidate beams, one or more of a beamforming gain, an angle of arrival of a wireless signal, an azimuth, or an elevation.

In a fifth additional aspect, alone or in combination with one or more of the first through fourth aspects, the one or more parameters include one or more of a rotation direction, a rotation speed, a rotation duration, a rotation axis, an angular velocity, or an angular displacement or orientation of the UE.

In a sixth additional aspect, alone or in combination with one or more of the first through fifth aspects, the second set of candidate beams does not include one or more beams in the first set of candidate beams associated with respective probabilities that fail to satisfy a threshold.

In a seventh additional aspect, alone or in combination with one or more of the first through eighth aspects, the second set of candidate beams includes one or more beams in the first set of candidate beams associated with respective probabilities that satisfy a threshold.

In an eighth additional aspect, alone or in combination with one or more of the first through seventh aspects, each beam in the second set of candidate beams is measured a quantity of times in the beam sweep in accordance with the respective probabilities of each beam in the second set of candidate beams being the target beam.

In a ninth additional aspect, alone or in combination with one or more of the first through eighth aspects, each beam in the second set of candidate beams is measured according to a time delay associated with the respective probabilities of each beam in the second set of candidate beams being the target beam.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
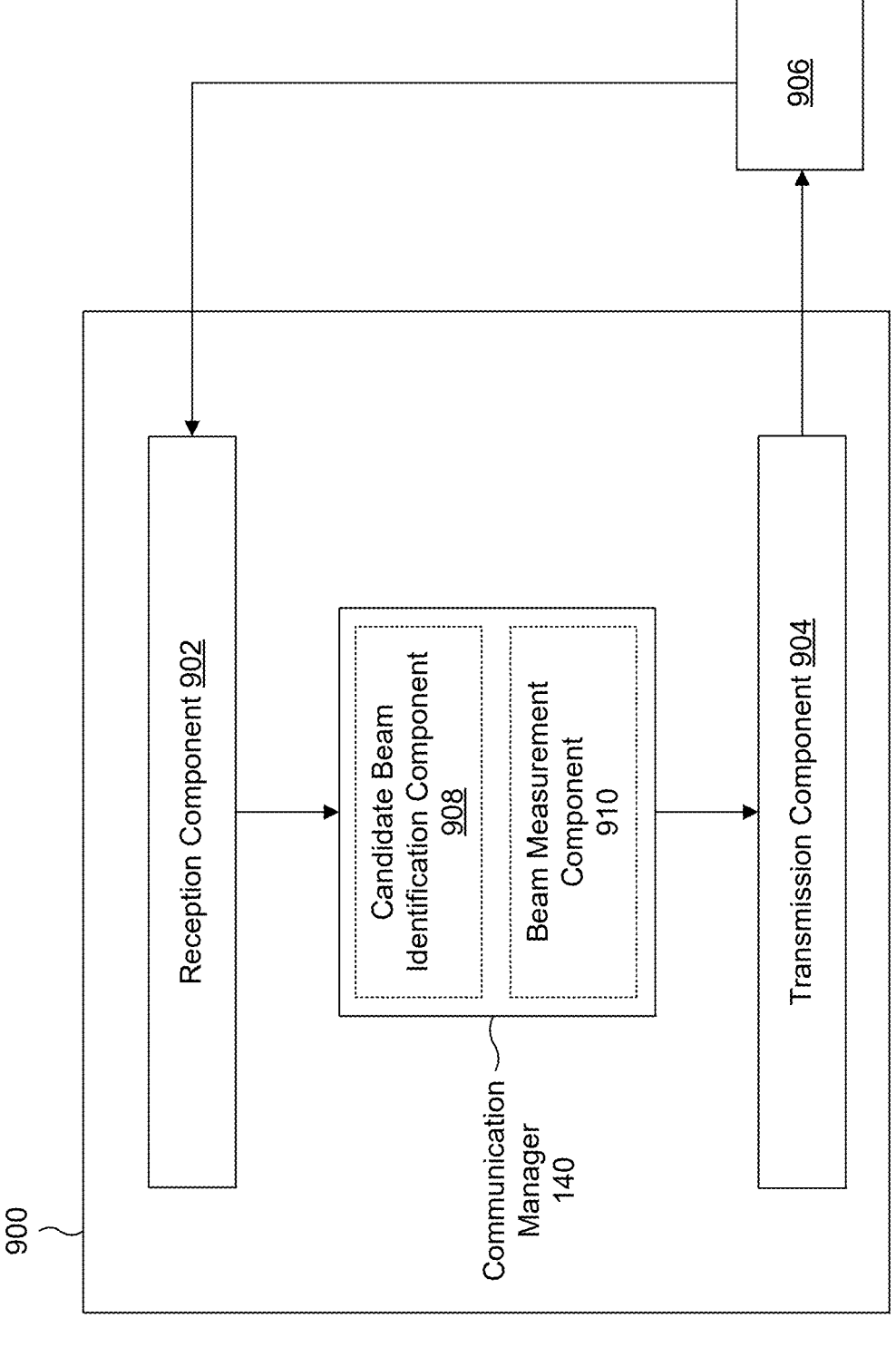
FIG. 9 is a diagram of an example apparatus for wireless communication in accordance with the present disclosure.

FIG. 9 is a diagram of an example apparatus 900 for wireless communication that supports beamformed communications in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIG. 7. Additionally or alternatively, the apparatus 900 may be configured to and/or operable to perform one or more processes described herein, such as process 800 of FIG. 8. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, one or more modems, one or more demodulators, one or more MIMO detectors, one or more receive processors, one or more controllers/processors, and/or one or more memories of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 904 may be co-located with the reception component 902 in one or more transceivers.

The communication manager 140 may determine, in accordance with a source beam and one or more parameters related to a propagation path, a probability of each beam in a first set of candidate beams being a target beam. The communication manager 140 may identify, among the first set of candidate beams, a second set of candidate beams to measure in a beam sweep according to the respective probabilities of each beam in the first set of candidate beams being the target beam. The communication manager 140 may measure each beam in the second set of candidate beams in the beam sweep. In some aspects, the communication manager 140 may perform one or more operations described elsewhere herein as being performed by one or more components of the communication manager 140.

The communication manager 140 may include one or more controllers/processors and/or one or more memories of the UE described above in connection with FIG. 2. In some aspects, the communication manager 140 includes a set of components, such as a candidate beam identification component 908, and/or a beam measurement component 910. Alternatively, the set of components may be separate and distinct from the communication manager 140. In some aspects, one or more components of the set of components may include or may be implemented within one or more controllers/processors and/or one or more memories of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The candidate beam identification component 908 may determine, in accordance with a source beam and one or more parameters related to a propagation path, a probability of each beam in a first set of candidate beams being a target beam. The candidate beam identification component 908 may identify, among the first set of candidate beams, a second set of candidate beams to measure in a beam sweep according to the respective probabilities of each beam in the first set of candidate beams being the target beam. The beam measurement component 910 may measure each beam in the second set of candidate beams in the beam sweep.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: determining, in accordance with a source beam and one or more parameters related to a propagation path, a probability of each beam in a first set of candidate beams being a target beam; identifying, among the first set of candidate beams, a second set of candidate beams to measure in a beam sweep according to the respective probabilities of each beam in the first set of candidate beams being the target beam; and measuring each beam in the second set of candidate beams in the beam sweep.

Aspect 2: The method of Aspect 1, wherein the second set of candidate beams is identified with respect to a reference signal transmitted by a network node.

Aspect 3: The method of any of Aspects 1-2, wherein the one or more parameters related to the propagation path include an RSRP measurement associated with each beam in the first set of candidate beams.

Aspect 4: The method of any of Aspects 1-3, wherein the one or more parameters related to the propagation path include one or more parameters related to a beam shape associated with each beam in the first set of candidate beams.

Aspect 5: The method of Aspect 4, wherein the one or more parameters related to the beam shape include, for each beam in the first set of candidate beams, one or more of a beamforming gain, an angle of arrival of a wireless signal, an azimuth, or an elevation.

Aspect 6: The method of any of Aspects 1-5, wherein the one or more parameters include one or more of a rotation direction, a rotation speed, a rotation duration, a rotation axis, an angular velocity, or an angular displacement or orientation of the UE.

Aspect 7: The method of any of Aspects 1-6, wherein the second set of candidate beams does not include one or more beams in the first set of candidate beams associated with respective probabilities that fail to satisfy a threshold.

Aspect 8: The method of any of Aspects 1-7, wherein the second set of candidate beams includes one or more beams in the first set of candidate beams associated with respective probabilities that satisfy a threshold.

Aspect 9: The method of any of Aspects 1-8, wherein each beam in the second set of candidate beams is measured a quantity of times in the beam sweep in accordance with the respective probabilities of each beam in the second set of candidate beams being the target beam.

Aspect 10: The method of any of Aspects 1-9, wherein each beam in the second set of candidate beams is measured according to a time delay associated with the respective probabilities of each beam in the second set of candidate beams being the target beam.

Aspect 11: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-10.

Aspect 12: An apparatus for wireless communication at a device, the apparatus comprising one or more memories and one or more processors coupled to the one or more memories, the one or more processors configured to cause the device to perform the method of one or more of Aspects 1-10.

Aspect 13: An apparatus for wireless communication, the apparatus comprising at least one means for performing the method of one or more of Aspects 1-10.

Aspect 14: A non-transitory computer-readable medium storing code for wireless communication, the code comprising instructions executable by one or more processors to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

Aspect 16: A device for wireless communication, the device comprising a processing system that includes one or more processors and one or more memories coupled with the one or more processors, the processing system configured to cause the device to perform the method of one or more of Aspects 1-10.

Aspect 17: An apparatus for wireless communication at a device, the apparatus comprising one or more memories and one or more processors coupled to the one or more memories, the one or more processors individually or collectively configured to cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:
   a processing system that includes one or more processors and one or more memories coupled with the one or more processors, the processing system configured to cause the UE to:
      determine, in accordance with a source beam and using one or more parameters related to a propagation path, a probability of each beam in a first set of candidate beams being a target beam,
         wherein the one or more parameters related to the propagation path include one or more parameters related to a beam shape associated with each beam in the first set of candidate beams;
      identify, among the first set of candidate beams, a second set of candidate beams to measure in a beam sweep according to respective probabilities of each beam in the first set of candidate beams being the target beam;
      measure each beam in the second set of candidate beams in the beam sweep; and
      select, based on measurements of each beam in the second set of candidate beams in the beam sweep, the target beam to be used for communication.

2. The UE of claim 1, wherein the second set of candidate beams is identified with respect to a reference signal transmitted by a network node.

3. The UE of claim 1, wherein the one or more parameters related to the propagation path include a reference signal received power (RSRP) measurement associated with each beam in the first set of candidate beams.

4. The UE of claim 1, wherein the one or more parameters related to the beam shape include, for each beam in the first set of candidate beams, one or more of a beamforming gain, an angle of arrival of a wireless signal, an azimuth, or an elevation.

5. The UE of claim 1, wherein the one or more parameters related to the propagation path include one or more of a rotation direction, a rotation speed, a rotation duration, a rotation axis, an angular velocity, or an angular displacement or orientation of the UE.

6. The UE of claim 1, wherein the second set of candidate beams does not include one or more beams in the first set of candidate beams associated with respective probabilities that fail to satisfy a threshold.

7. The UE of claim 1, wherein the second set of candidate beams includes one or more beams in the first set of candidate beams associated with respective probabilities that satisfy a threshold.

8. The UE of claim 1, wherein the processing system, to measure each beam in the second set of candidate beams in the beam sweep, is configured to cause the UE to:

measure each beam in the second set of candidate beams a quantity of times in the beam sweep in accordance with respective probabilities of each beam in the second set of candidate beams being the target beam.

9. The UE of claim 1, wherein the processing system, to measure each beam in the second set of candidate beams in the beam sweep, is configured to cause the UE to:

measure each beam in the second set of candidate beams in the beam sweep according to a time delay associated with respective probabilities of each beam in the second set of candidate beams being the target beam.

10. A method of wireless communication performed by a user equipment (UE), comprising:

determining, in accordance with a source beam and using one or more parameters related to a propagation path, a probability of each beam in a first set of candidate beams being a target beam, wherein the one or more parameters related to the propagation path include one or more parameters related to a beam shape associated with each beam in the first set of candidate beams;

identifying, among the first set of candidate beams, a second set of candidate beams to measure in a beam sweep according to respective probabilities of each beam in the first set of candidate beams being the target beam;

measuring each beam in the second set of candidate beams in the beam sweep; and selecting, based on measurements of each beam in the second set of candidate beams in the beam sweep, the target beam to be used for communication.

11. The method of claim 10, wherein the second set of candidate beams is identified with respect to a reference signal transmitted by a network node.

12. The method of claim 10, wherein the one or more parameters related to the propagation path include a reference signal received power (RSRP) measurement associated with each beam in the first set of candidate beams.

13. The method of claim 10, wherein the one or more parameters related to the propagation path include one or more of a rotation direction, a rotation speed, a rotation duration, a rotation axis, an angular velocity, or an angular displacement or orientation of the UE.

14. The method of claim 10, wherein the second set of candidate beams does not include one or more beams in the first set of candidate beams associated with respective probabilities that fail to satisfy a threshold.

15. The method of claim 10, wherein the second set of candidate beams includes one or more beams in the first set of candidate beams associated with respective probabilities that satisfy a threshold.

16. The method of claim 10, wherein each beam in the second set of candidate beams is measured a quantity of times in the beam sweep in accordance with respective probabilities of each beam in the second set of candidate beams being the target beam.

17. The method of claim 10, wherein each beam in the second set of candidate beams is measured according to a time delay associated with respective probabilities of each beam in the second set of candidate beams being the target beam.

18. An apparatus for wireless communication, comprising:

means for determining, in accordance with a source beam and using one or more parameters related to a propagation path, a probability of each beam in a first set of candidate beams being a target beam, wherein the one or more parameters related to the propagation path include one or more parameters related to a beam shape associated with each beam in the first set of candidate beams;

means for identifying, among the first set of candidate beams, a second set of candidate beams to measure in a beam sweep according to respective probabilities of each beam in the first set of candidate beams being the target beam;

means for measuring each beam in the second set of candidate beams in the beam sweep; and means for selecting, based on measurements of each beam in the second set of candidate beams in the beam sweep, the target beam to be used for communication.

19. The UE of claim 5, wherein the one or more parameters related to the propagation path include the one or more of the rotation direction, the rotation speed, the rotation duration, the rotation axis, the angular velocity, or the angular displacement or orientation of the UE as a function of time.

20. The method of claim 10, wherein the one or more parameters related to the beam shape include, for each beam in the first set of candidate beams, one or more of a beamforming gain, an angle of arrival of a wireless signal, an azimuth, or an elevation.

* * * * *